(12) United States Patent
Venkatachary et al.

(10) Patent No.: US 7,500,263 B2
(45) Date of Patent: Mar. 3, 2009

(54) METHODS AND SYSTEMS FOR ACCESSING NETWORKS, METHODS AND SYSTEMS FOR ACCESSING THE INTERNET

(75) Inventors: Srinivasan Venkatachary, Bellevue, WA (US); Paramvir Bahl, Issaquah, WA (US); Anand Balachandran, La Jolla, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/390,592

(22) Filed: Mar. 28, 2006

(65) Prior Publication Data

US 2006/0168454 A1    Jul. 27, 2006

Related U.S. Application Data

(63) Continuation of application No. 09/565,558, filed on May 5, 2000, now Pat. No. 7,032,241, which is a continuation of application No. 09/511,171, filed on Feb. 22, 2000, now Pat. No. 6,834,341.

(51) Int. Cl.
*G06F 7/04* (2006.01)
*G06K 19/00* (2006.01)
*H04L 9/32* (2006.01)

(52) U.S. Cl. .......................................... 726/4
(58) Field of Classification Search ............. 726/4
See application file for complete search history.

(56) References Cited

U.S. PATENT DOCUMENTS 4,309,771 A    1/1982  Wilkens
5,010,553 A    4/1991  Scheller et al.

(Continued)

FOREIGN PATENT DOCUMENTS

WO    WO98/32301    7/1998

(Continued)

OTHER PUBLICATIONS

"Wireless Application Environment Overview" WAP Forum 1998.

(Continued)

*Primary Examiner*—Kambiz Zand
*Assistant Examiner*—Farid Homayounmehr

(57) ABSTRACT

Systems and methods for providing network access, e.g. Internet access, are described. An architecture includes a host organization network through which network access is provided. The host organization network can be advantageously deployed in public areas such as airports and shopping malls. An authentication/negotiation component is provided for authenticating various users and negotiating for services with service providers on behalf of the system users. The authentication/negotiation component can include one or more specialized servers and a policy manager that contains policies that govern user access to the Internet. An authentication database is provided and authenticates various users of the system. An access module is provided through which individual client computing devices can access the Internet. In one embodiment, the access module comprises individual wireless access points that permit the client computing devices to wirelessly communicate data packets that are intended for the Internet. In one aspect, users are given a variety of choices of different service levels that they can use for accessing the Internet. The service levels can vary in such things as bandwidth allocation and security measures. The various service levels can be purchased by the users using their computing devices.

17 Claims, 11 Drawing Sheets

U.S. PATENT DOCUMENTS

| | | |
|---|---|---|
| 5,138,616 A | 8/1992 | Wagner, Jr. et al. |
| 5,179,591 A | 1/1993 | Hardy et al. |
| 5,199,069 A | 3/1993 | Barrett et al. |
| 5,229,768 A | 7/1993 | Thomas |
| 5,339,316 A | 8/1994 | Diepstraten |
| 5,341,426 A | 8/1994 | Barney et al. |
| 5,455,863 A | 10/1995 | Brown et al. |
| 5,590,133 A | 12/1996 | Billstrom et al. |
| 5,625,690 A | 4/1997 | Michel et al. |
| 5,670,950 A | 9/1997 | Otsuka |
| 5,699,365 A | 12/1997 | Klayman et al. |
| 5,701,302 A | 12/1997 | Geiger |
| 5,724,423 A | 3/1998 | Khello |
| 5,742,598 A | 4/1998 | Dunn et al. |
| 5,742,763 A | 4/1998 | Jones |
| 5,745,884 A | 4/1998 | Carnegie et al. |
| 5,761,621 A | 6/1998 | Sainton |
| 5,784,566 A | 7/1998 | Viavant et al. |
| 5,802,502 A | 9/1998 | Gell et al. |
| 5,812,968 A | 9/1998 | Hassan et al. |
| 5,870,561 A | 2/1999 | Jarvis et al. |
| 5,898,780 A | 4/1999 | Liu et al. |
| 5,901,352 A | 5/1999 | St-Pierre et al. |
| 5,956,372 A | 9/1999 | Vaman et al. |
| 6,005,926 A | 12/1999 | Mashinsky |
| 6,021,198 A | 2/2000 | Anigbogu et al. |
| 6,044,062 A | 3/2000 | Brownrigg et al. |
| 6,046,980 A | 4/2000 | Packer |
| 6,055,571 A | 4/2000 | Fulp et al. |
| 6,078,566 A | 6/2000 | Kikinis |
| 6,088,451 A * | 7/2000 | He et al. .................. 726/4 |
| 6,094,486 A | 7/2000 | Marchant |
| 6,128,735 A | 10/2000 | Goldstein et al. |
| 6,134,453 A | 10/2000 | Sainton et al. |
| 6,145,002 A | 11/2000 | Srinivasan |
| 6,145,005 A | 11/2000 | Kirkby |
| 6,148,192 A * | 11/2000 | Ahvenainen .............. 455/410 |
| 6,148,405 A | 11/2000 | Liao et al. |
| 6,151,309 A | 11/2000 | Busuioc et al. |
| 6,154,489 A | 11/2000 | Kleider et al. |
| 6,154,778 A | 11/2000 | Koistinen et al. |
| 6,167,060 A | 12/2000 | Vargo et al. |
| 6,223,287 B1 | 4/2001 | Douglas et al. |
| 6,223,291 B1 | 4/2001 | Puhl et al. |
| 6,226,365 B1 | 5/2001 | Mashinsky |
| 6,233,446 B1 * | 5/2001 | Do .......................... 455/410 |
| 6,240,183 B1 | 5/2001 | Marchant |
| 6,243,754 B1 | 6/2001 | Guerin et al. |
| 6,269,157 B1 | 7/2001 | Coyle |
| 6,298,234 B1 | 10/2001 | Brunner |
| 6,314,190 B1 | 11/2001 | Zimmermann |
| 6,314,519 B1 | 11/2001 | Davis et al. |
| 6,338,140 B1 | 1/2002 | Owens et al. |
| 6,339,450 B1 | 1/2002 | Chang et al. |
| 6,363,150 B1 | 3/2002 | Bhagavath et al. |
| 6,397,259 B1 | 5/2002 | Lincke et al. |
| 6,434,380 B1 | 8/2002 | Andersson et al. |
| 6,477,669 B1 | 11/2002 | Agarwal et al. |
| 6,515,972 B1 | 2/2003 | Gage et al. |
| 6,546,392 B1 | 4/2003 | Bahlmann |
| 6,546,424 B1 | 4/2003 | Cucchiara |
| 6,556,659 B1 | 4/2003 | Bowman-Amuah |
| 6,590,885 B1 | 7/2003 | Jorgensen |
| 6,636,894 B1 | 10/2003 | Short et al. |
| 6,728,266 B1 | 4/2004 | Sabry et al. |
| 6,745,012 B1 | 6/2004 | Ton et al. |
| 6,775,267 B1 | 8/2004 | Kung et al. |
| 6,829,480 B1 | 12/2004 | Hoglund et al. |
| 6,834,341 B1 * | 12/2004 | Bahl et al. ................. 713/156 |
| 7,003,282 B1 * | 2/2006 | Ekberg ..................... 455/411 |
| 7,007,080 B2 | 2/2006 | Wilson |
| 7,032,241 B1 * | 4/2006 | Venkatachary et al. ......... 726/4 |
| 7,039,708 B1 * | 5/2006 | Knobl et al. ............... 709/227 |
| 7,085,924 B2 | 8/2006 | Bahl et al. |
| 7,089,415 B2 | 8/2006 | Bahl et al. |
| 7,106,756 B1 | 9/2006 | Donovan et al. |
| 7,149,896 B1 * | 12/2006 | Bahl et al. ................. 713/166 |
| 7,190,284 B1 | 3/2007 | Dye et al. |
| 7,313,237 B2 | 12/2007 | Bahl et al. |
| 2002/0099854 A1 | 7/2002 | Jorgensen |
| 2003/0033522 A1 | 2/2003 | Bilgic et al. |

FOREIGN PATENT DOCUMENTS

| | | |
|---|---|---|
| WO | WO9832254 A1 | 7/1998 |
| WO | WO99/01969 A1 | 1/1999 |
| WO | WO 0002406 A2 * | 1/2000 |

OTHER PUBLICATIONS

Brown et al., "M-TCP for Mobile Cellular Networks" ACM SIGCOMM Computer Communication Review Jul. 29, 1997 pp. 19 through 43.

C.E. Shannon, "A Mathematical Theory of Communication" The Bell System Technical Journal vol. 27 Jul. and Oct. 1948 79 pages.

C.R. Raviraj and E.V. Jones, "Adaptive Coding for Conversational Speech Communication" Second IEEE National Conference on Telecommunications Apr. 2-5, 1989 pp. 344-348.

Casner et al., "Compressing IP/UDP/RTP Headers for Low-Speed Serial Links" Network Working Group Feb. 1999 pp. 1-23.

Cleary et al., "Data Compression Using Adaptive Coding and Partial String Matching" IEEE Transactions on Communication vol. COM-32 No. 4 Apr. 1984 pp. 396-402.

Jonsson et al., "Robust Checksum-based header Copression (ROCCO)" Network Working Group Mar. 10, 2000 pp. 1-67.

Lin et al., "Authentication Protocols in Wireless Communications" 1995.

Tatebayashi et al., "Key Distribution Protocol for Digital Mobile Communication Systems," 1989.

Definition of "Information Superhighway", Microsoft Computer Dictionary, Microsoft Press, 5th Edition, Published 2002, p. 272.

* cited by examiner

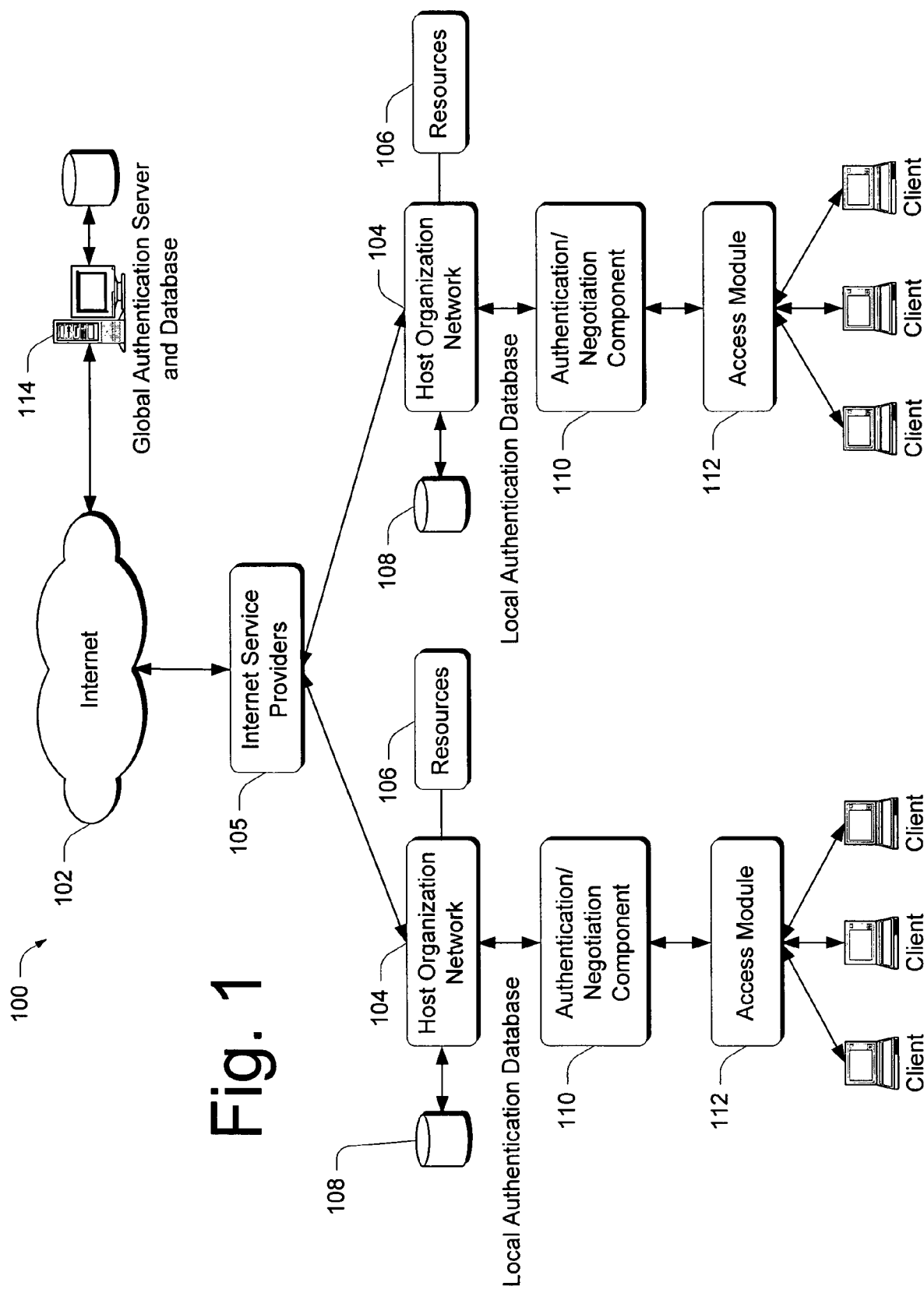

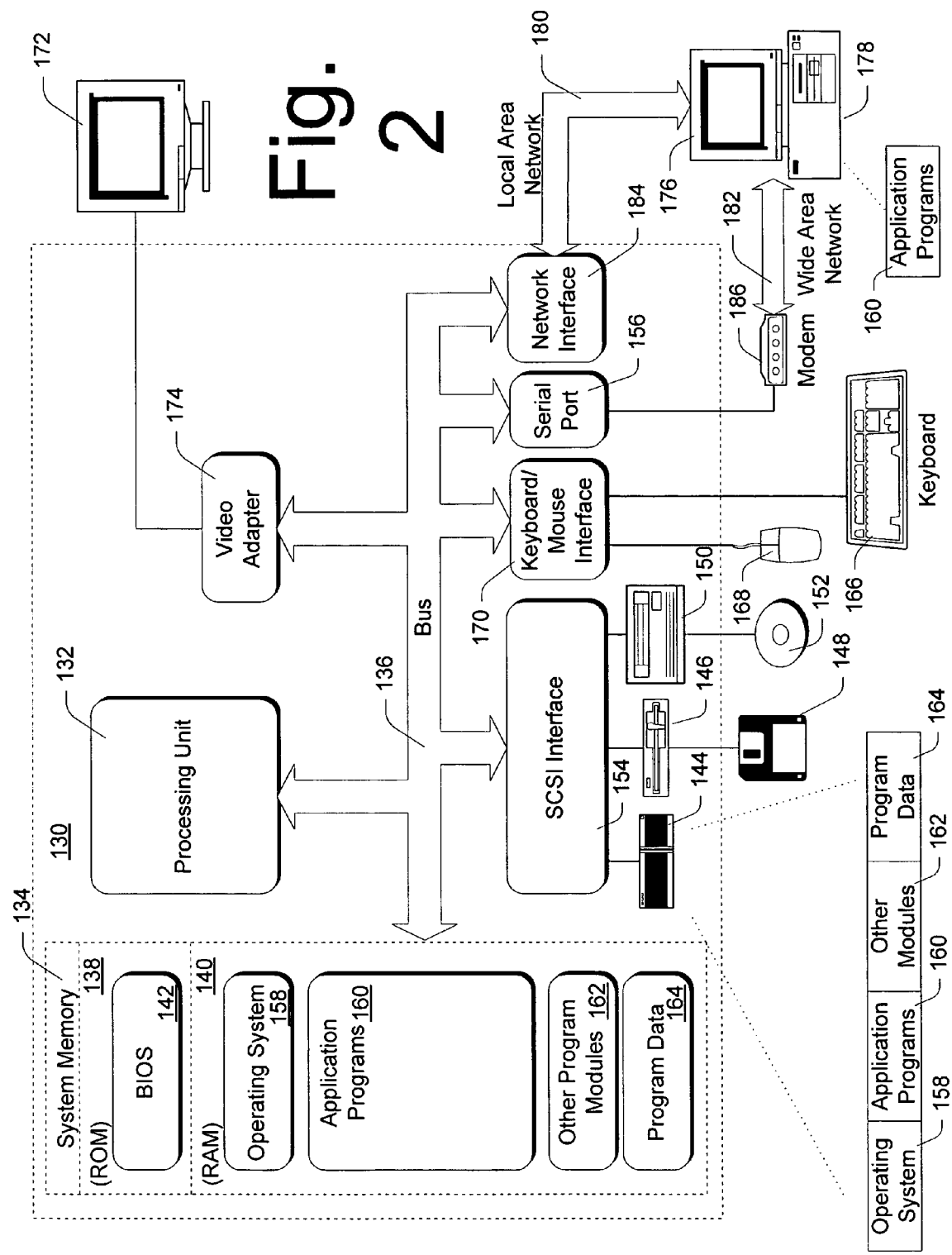

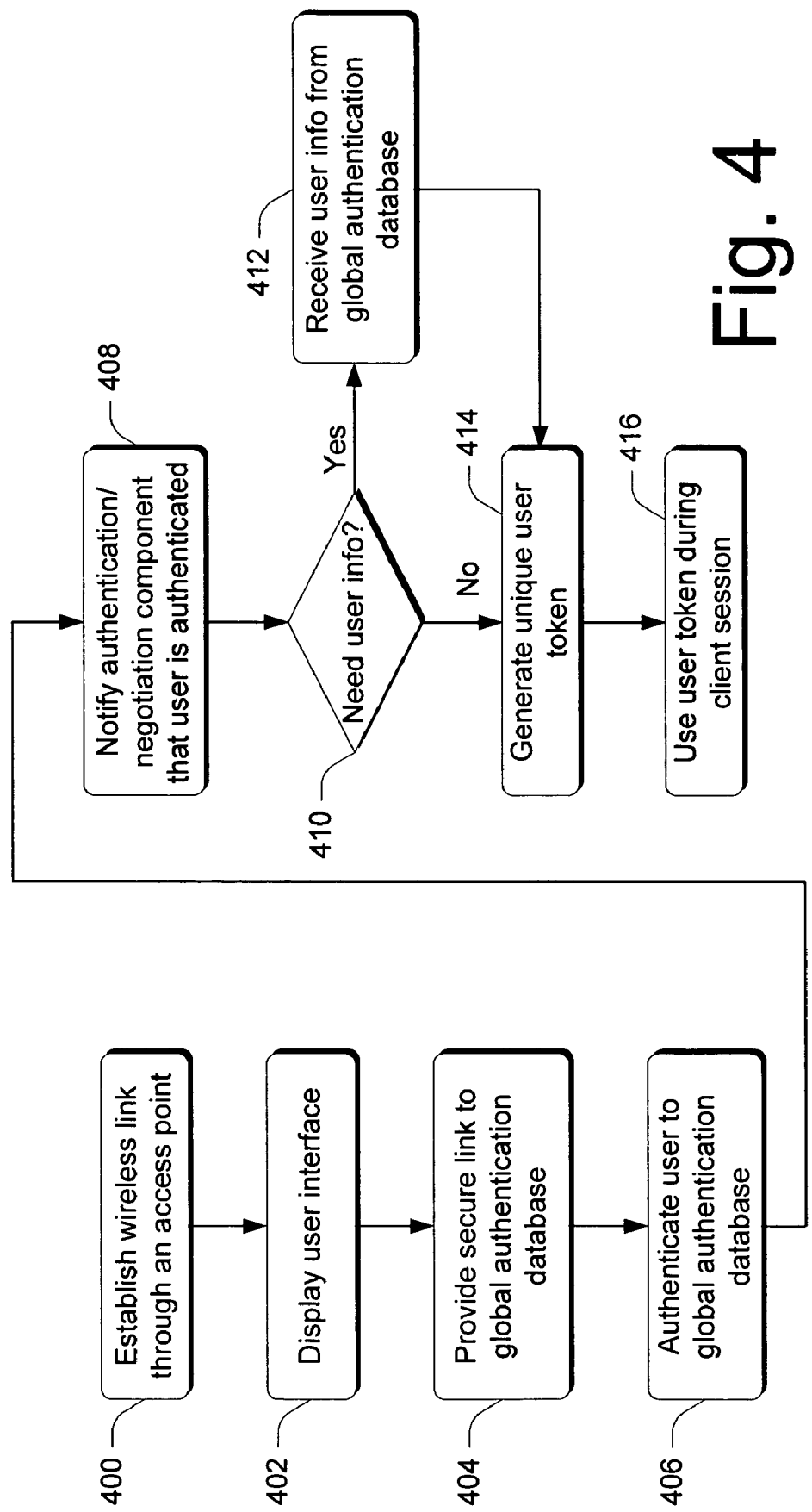

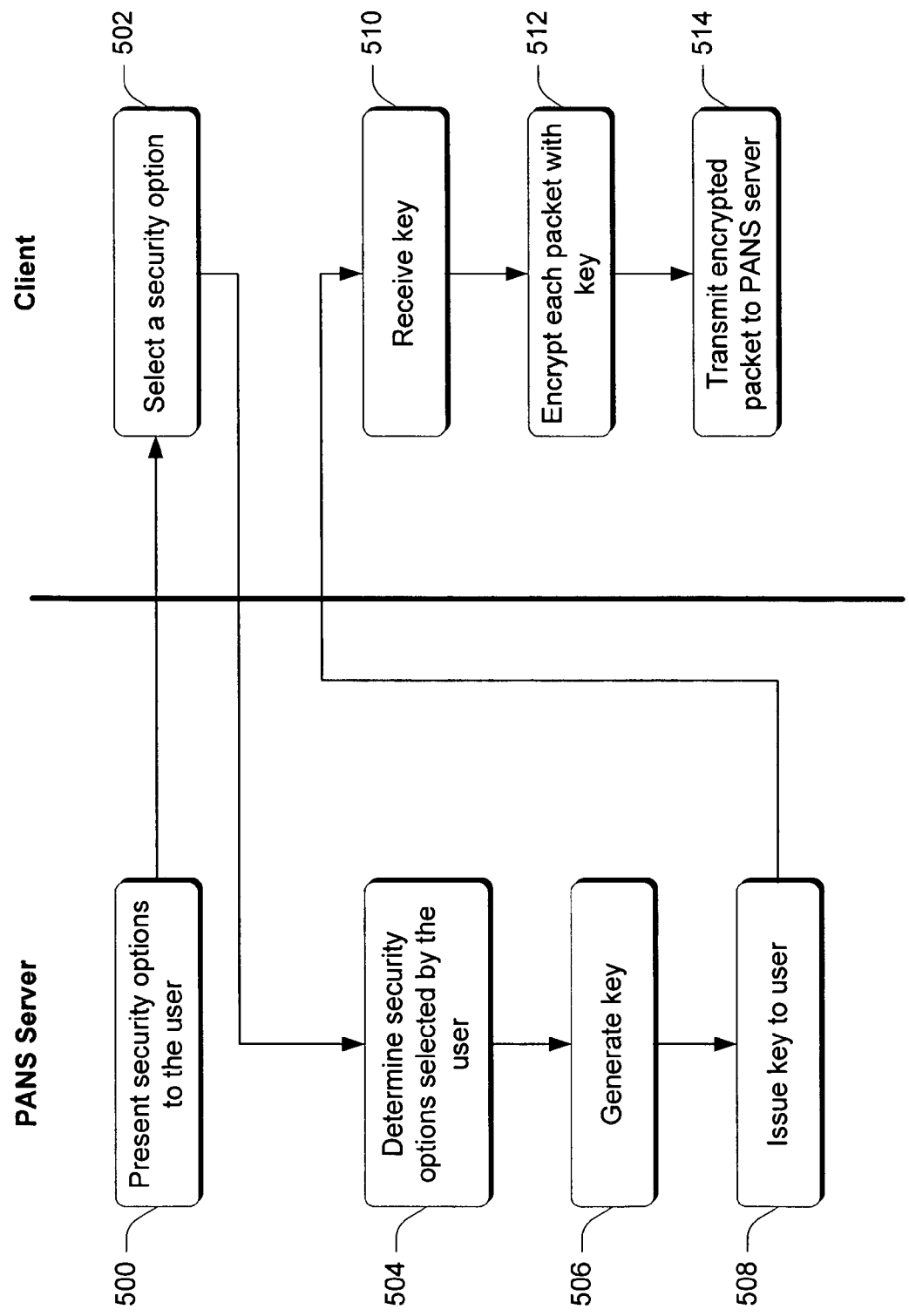

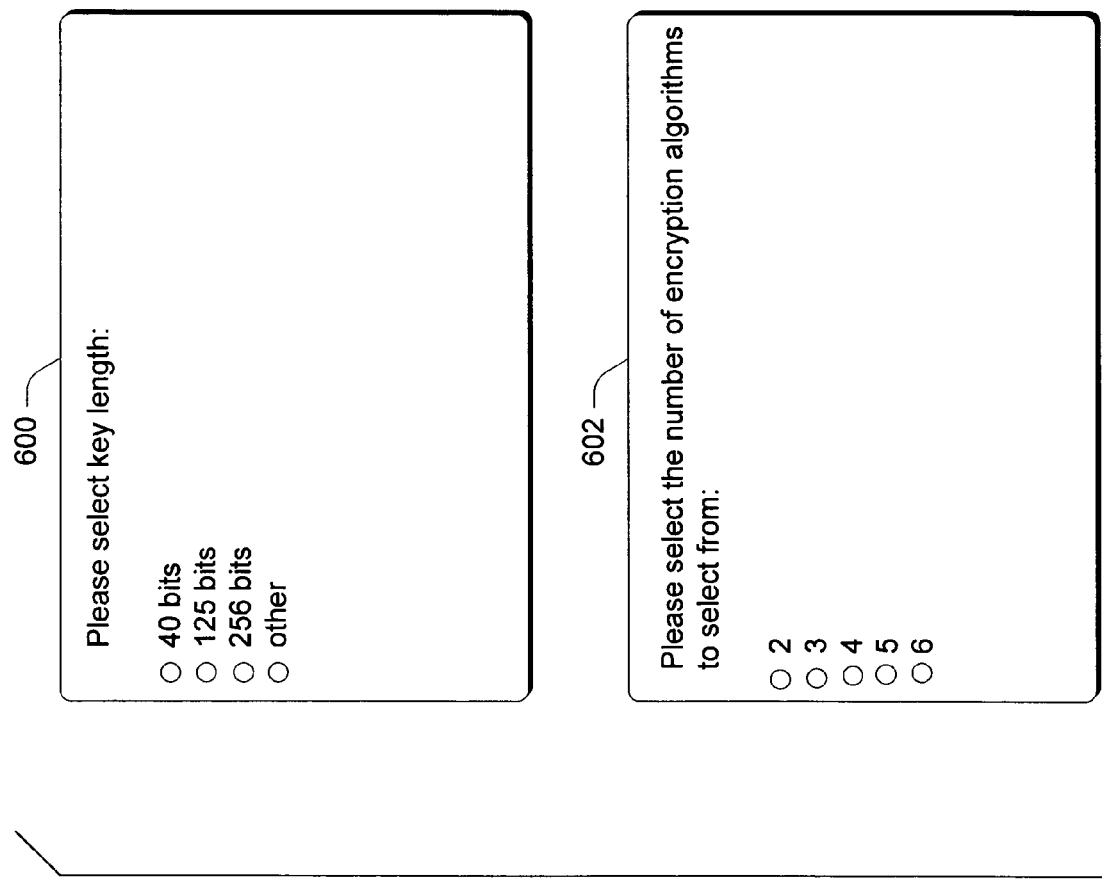

METHODS AND SYSTEMS FOR ACCESSING NETWORKS, METHODS AND SYSTEMS FOR ACCESSING THE INTERNET

RELATED APPLICATION

This application is a continuation of and claims priority to U.S. patent application Ser. No. 09/565,558, filed on May 5, 2000 which, in turn, claims priority to U.S. patent application Ser. No. 09/511,171, filed on Feb. 22, 2000, the disclosures of which are incorporated by reference herein.

TECHNICAL FIELD

The present invention relates to methods and systems for accessing networks. In particular, the invention relates to methods and systems for accessing the Internet.

BACKGROUND

As network technologies continue to evolve, the possibility of connecting people and organizations together in more efficient arrangements grows. Networks such as the cellular phone networks give individuals the ability to move around freely, yet still communicate over the telephone with other individuals. For example, in the last few years the explosive growth of the use of cellular phones has increased tremendously the ability of people to connect with other people from a variety of different locations (i.e. in the car, at a restaurant, in the super market). As societies become more and more mobile, new solutions are required to satisfy the growing demands and needs of these mobile individuals.

As one example, consider the traditional network paradigm for Internet access. Traditionally, there are a couple of different ways for an individual to access the Internet. First, the individual might have a personal account with an Internet Service Provider (ISP) whereby they can access the Internet through, for example, their home computer. Their home computer establishes a link with the ISP through a modem or special communication line. Once the link is established, generally over a wired line, they can typically use ISP-provided software to browse the Internet. In this example, an individual's Internet access is either tied to their wired link provider, or to the ISP through which they have their account. Second, an individual might be able to access the Internet through a network that is provided and maintained by their employer. While they are at work, they can access the Internet through the use of employer-provided resources. In this example, an individual's Internet access is tied to their employer and/or their employer's resources.

Neither of these paradigms provides an individual with the freedom to access the Internet from any location and without any dependence on a particular ISP or their company. Rather, Internet accessibility for these individuals is necessarily tied to either or both of (1) signing up for an account with a particular ISP for Internet access, or (2) being a member of a particular corporation through which Internet access is provided. It would be desirable to eliminate the dependence of Internet access on either or both of these elements.

Presently, there is much enthusiasm around the impending deployment and availability of the so-called "third generation" (3G) wide-area cellular networks. These 3G wide-area cellular networks will give individuals the ability to connect to other individuals, via a cellular phone, from many different locations. Furthermore, these networks will enable individuals to transmit and receive data packets which are necessary for Internet communications.

There are, however, limitations that are inherent with both the current wide-area cellular networks and the future 3G wide-area cellular networks that make their use as an Internet connectivity medium less than desirable. For example, current wide-area data networks (e.g. which use a Ricochet modem from Metricom) support transmission rates that are about 50 Kbps. In the next few years, when 3G wide-area cellular networks are available, the data packet transmission rates are expected to go up to around 2 Mbps per cell size. Each cell is generally sized between 1 to 2 miles in diameter, depending on where the cell is located. A data rate of 2 Mbps per cell size means that the maximum data rate an individual in a cell can hope to get will be around 2 Mbps when there are no other individuals using the network. A more realistic scenario is the case where there are several hundred individuals in a single cell. In this case, any individual might get only 100 to 150 kbps of bandwidth for data transmission. This transmission rate is frustratingly slow and will inevitably lead to customer dissatisfaction.

In the local area networking space (i.e. networking within a building or a home), transmission rates are as high as 11 Mbps today. In the near future, these rates are expected to go up to around 54 Mbps. In the more distant future (e.g. in about 5 years), this rate is expected to be upwards of 100 Mbps. Thus, there is a disparity between local area wireless network (WLAN) system performance and wide area wireless network (WWAN) system performance in terms of access speeds. Using the above transmission rates, it can be seen that the difference in system performance is about 25 times faster in WLANs than in WWANs.

This has led to a problem for which a solution has not yet been found. The problem concerns how to provide high speed Internet access from all places beyond those traditionally in the domain of LANs (i.e. corporations and homes). For example, individuals often spend a great deal of time in public places such as airports, libraries, and restaurants. Yet, Internet access is not typically provided in these public areas. If Internet access is provided, it is typically tied to a particular ISP and the consumer really has no choices whatsoever concerning such things as quality of service, type of service available, and the like.

Accordingly, this invention arose out of concerns associated with improving network access so that a network, such as the Internet, can be accessed from a variety of places or locations at high speeds. In particular, the invention arose out of concerns associated with enhancing Internet wireless connectivity speeds in the wide area.

SUMMARY

Various embodiments pertain to enhancing wireless functionality, and particularly to providing fast network access, e.g. Internet access, by pushing local area wireless network system performance and functionality into the wide area space. Wide area data networking data rates are much slower than local area data networking rates. Aspects of the described embodiments exploit the higher data rates that are available through the use of local area networks pushing this functionality into the wide area space. Aspects of the described embodiments have applicability in both wireless and wired networks.

In one embodiment, an architecture is provided, by one or more host organizations, for providing individuals with fast wireless access to the Internet. These networks are advantageously deployed in public areas such as airports, shopping malls, libraries etc. The host organization may partition this network either physically, or logically, into several smaller networks called subnets. Each subnet may include a PANS (Protocol for Authentication and Negotiation of Services) Server and a Policy Manager. A mobile user typically establishes a communication link with the PANS server through an Access Point, and thereafter wirelessly transmits and receives data to and from the Internet via the PANS server. The positioning of the PANS server in the subnet is such that data traffic from all users connected to this subnet goes through this server before reaching any other network, including the Internet.

The PANS server is programmed to perform a number of different functions in connection with providing network or Internet access. In one embodiment, the PANS server ensures that users are authenticated to the system before allowing them to send and receive data packets to and from the Internet. In one aspect, authentication takes place through the use of an authentication database. In one embodiment, the authentication database is a globally accessible database and authentication takes place in a secure manner between the client and the database (i.e. the PANS server is not privy to the exchange of the information during authentication). In another embodiment, the authentication database is available locally to the PANS server. After the global or the local database authenticates the user, the user receives a unique token or key from the PANS server. The user uses this token or key to identify himself or herself to the PANS server in all subsequent data packet transmissions. All user data packets containing this token or key, intended for the Internet, are allowed passage through the PANS server.

In one embodiment, the user is given various choices concerning Internet accessibility and the levels of service that are provided. For example, the PANS server is programmed, in some embodiments, to negotiate with ISPs for Internet access on behalf of users that are unaffiliated with an ISP. A user can define the type of access they want (i.e. data rate, and perhaps the price they are willing to pay), and the PANS server handles negotiation with the ISPs on the user's behalf.

In another embodiment, the PANS server provides flexible levels of security for the user or client. For example, each user or client can be issued his or her own key, dynamically generated by the PANS server, for use in encrypting data packets that are transmitted to the PANS server. Each key can be of an arbitrary length that is selectable by the user or the PANS server. In addition, the PANS server can have a number of different encryption algorithms from which to choose when a user is authenticated. Thus, a user can be handed a key having an arbitrary length, and a randomly selected encryption algorithm to use when encrypting their data packets.

In another embodiment, the PANS server is programmed to account for the data packets that pass through it. Accounting for the data packets assists the PANS server in charging clients for using the network, e.g. on a per packet or a per byte basis, or a per transaction basis. In addition, accounting for the data packets can help the PANS server in scheduling data packets for transmission.

In another embodiment, the PANS server is configured to provide the user with an option to select a quality-of-service (QoS) level. Different costs can be associated with different QoS levels. For example, a premium level can provide the highest degree of security and a guaranteed amount of bandwidth. Other levels might provide lesser degrees of security and lesser amounts of bandwidth. In one aspect, the highest service level is available on a user-by-user basis where individual users have a guaranteed amount of bandwidth and a very high degree of security. Lesser levels of service are defined in terms of groups, where each group contains a plurality of users. Bandwidth allocations in these groups take place on a group basis, with members of the groups having to arbitrate for use of the available allocated bandwidth. Each user is thus assured of receiving a fair share of the associated allocated bandwidth.

In another embodiment, dynamic compression is utilized to ensure that data packets are transmitted in an optimal manner. In the described wireless embodiment, the PANS server (or the client) monitors the wireless medium for transmission errors that might be caused by an obstruction in the line of sight between the client and an access point. Whenever a pre-determined number of errors are detected, measures are taken to lessen the degree of compression that is utilized on the data packets. When the errors abate, the degree of compression is increased. In effect, the amount of compression is modulated by the amount of transmission errors that are detected during a sample period.

In another embodiment, a user interface is provided and provides feedback to the user regarding their service level. Through the interface, the user can adjust their quality of service level and observe a feedback mechanism that confirms their quality of service level, i.e. actual bandwidth provided by the network.

In addition to the PANS Server, there exists a Policy Manager which includes and manages various policies that determine the context of a particular user's interaction with the network. For example, the Policy Manager can define the level of service that a user receives, control access to host organization's resources such as printers and fax machines etc., and the like. The Policy Manager and the PANS server are communicatively linked so that the PANS server can enforce the policies from the Policy Manager on a per user and per connection basis.

BRIEF DESCRIPTION OF THE DRAWINGS

FIG. 1 is a high level diagram of an exemplary system architecture in accordance with one embodiment.

FIG. 2 is a diagram of a computer system that can be used to implement various aspects of various embodiments.

FIG. 4 is a flow diagram that describes steps in a method in accordance with one embodiment.

FIG. 5 is a flow diagram that describes steps in a method in accordance with one embodiment.

FIG. 6 is a diagram of an exemplary user display in accordance with one embodiment.

DETAILED DESCRIPTION

Overview

Figure 3A:
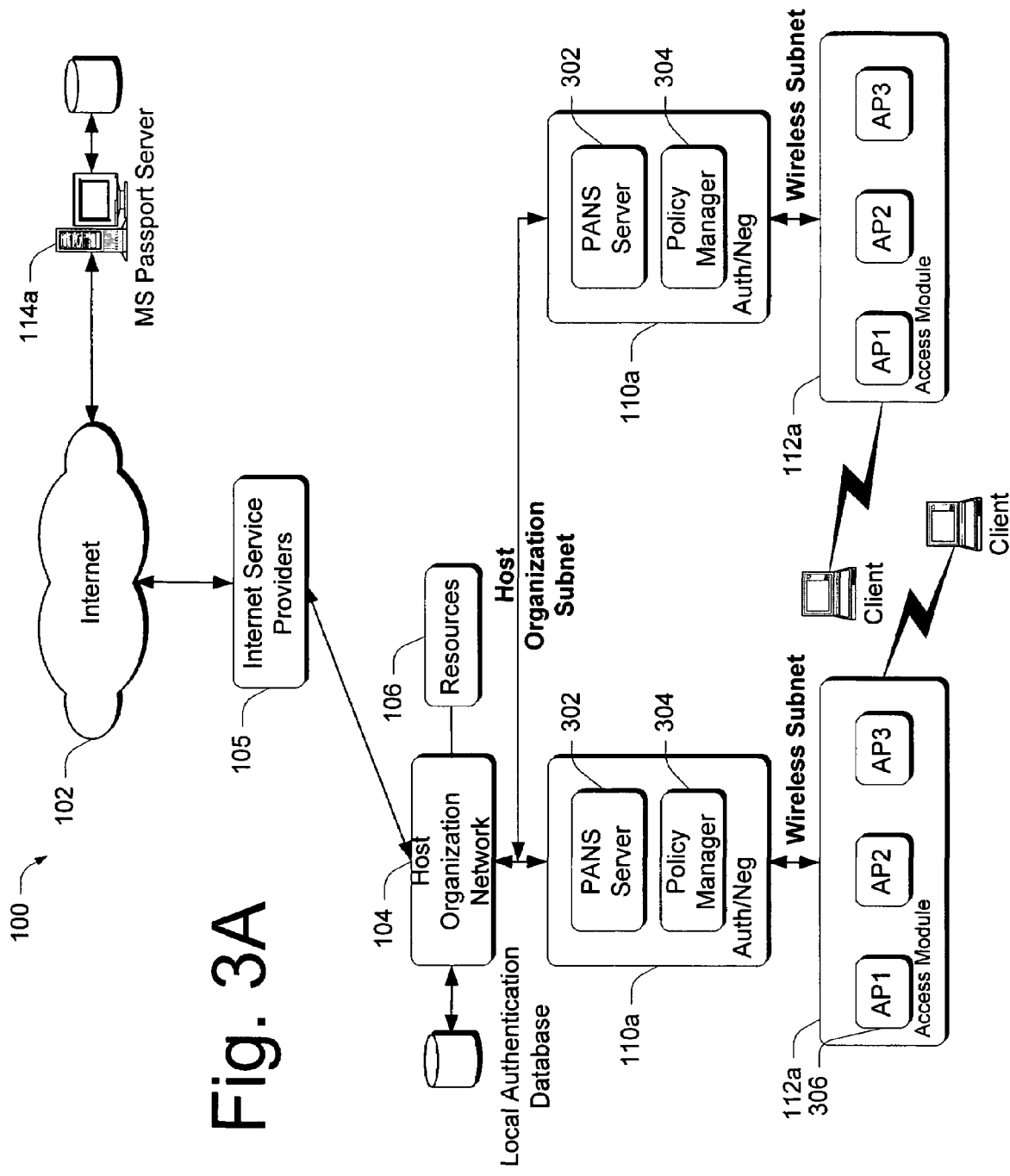
FIG. 3A is a high level diagram of an exemplary wireless system architecture in accordance with one embodiment.

In the described embodiments, systems and methods are provided for enhancing network access, e.g. Internet access, from any number of potential locations that are not necessarily the traditional LAN locations, i.e. corporations or homes. Individual users are given the opportunity to be mobile, yet connect with the Internet using a very high speed location. In addition, users can be given various choices that impact the level of service they are provided and the cost they are charged for such service. Users can pay for such services by any suitable method such as a credit card or a smart card based purchasing system. Access is no longer necessarily tied inextricably to a particular employer or a particular ISP. In various embodiments, flexibility and speed are enhanced through the incorporation of a host organization network that makes use of wireless communication. Users using mobile computing devices can wirelessly logon onto the network and access the Internet. In the described embodiment, interfacing that takes place with the user can be implemented as Web-based interfacing.

FIG. 1 shows a high level system diagram of an exemplary system architecture generally at 100 that is capable of implementing various features described below. Architecture 100 is used in connection with a computer network an exemplary one of which is the Internet 102. One or more host organization networks 104 are provided and are managed by a host organization. Examples of a host organization include individual businesses that might, for example, be located in a public area. Exemplary public areas include shopping malls, libraries, airports, downtown shopping areas and the like. So, for example, the leftmost host organization network 104 might be located in a shopping mall, while the rightmost host organization network might be located in an airport. A plurality of service providers can be incorporated in the architecture 100. In this example, the service providers control access to the Internet and comprise a plurality of different Internet Service Providers (ISPs) 105 that are communicatively linked with the host organization network 104. Each host organization network 104 can include one or more resources 106. Exemplary resources can include, without limitation, scanners, tape drives, laser printers, and the like. Each host organization network 104 might also include a local authentication database 108 for purposes that will be described below.

An authentication/negotiation component 110 is provided and is associated with each host organization network 104. Although the authentication/negotiation component 110 is shown as a combined component, it will be appreciated that component 110 can be programmed to implement only one of an authentication or negotiation function. Each of the components 110 is programmed/configured to perform various functions that relate to providing users with network access. Exemplary functions include authenticating the users, verifying the users during subsequent communication, and negotiating various services from various service providers for the user. In one particular embodiment, the verification function is performed by a verification module that is positioned at each access module 112. Providing a verification module at each access module is advantageous for quickly detecting rogue users without allowing them any access further up the architecture chain. As will be discussed below in more detail, the components 110 can negotiate, on behalf of the users, with the different ISPs 105 for Internet access. In some embodiments, the users are given choices as to different levels of service that they can be provided. The levels of service can be associated with different fees that the user is charged, and can include different bandwidth allocations, security measures, and ISPs. These choices are then used by the authentication/negotiation components 110 to negotiate a desired level of service from one or more service providers, e.g. ISPs 105.

The architecture also includes a plurality of access modules 112 that are configured to enable a user to access the authentication/negotiation component 110. Although only one access module is shown for each authentication/negotiation component 110, more than one access module 112 can be provided for each authentication/negotiation component 110. Architecture 100 can also include a global authentication database 114 that is configured to be globally accessible from anywhere in the world. In the illustrated example, the global authentication database includes not only a repository of data or information that is used to authenticate users, but also any server computers or computing devices that are used in connection with the data repository to authenticate a user. The global authentication database 114 is advantageously accessible via the Internet 102. The global authentication database 114 can be any suitable globally accessible database that is capable of authenticating users as described below. Such databases can be operated by and/or associated with particular businesses, organizations or clubs for which authentication is desired. For example, a particular organization, e.g. Gold Club Frequent Fliers, may have negotiated with authentication/negotiation component 110 for Internet access for its members. When the members access the network 112 through the access module 112, there needs to be a way to authenticate these Gold Club Frequent Flyer members so that they can be provided Internet access at the negotiated level. The global authentication database 114 provides a mechanism by which this can be done, as will become apparent below. Alternately, the global authentication database 114 can be a more generalized database that can be operated on behalf of many organizations or businesses that might want to generally authenticate users. An example of this type of global authentication database is Microsoft's Passport Server and database. The MS server and database enable a user to be individually verified against information that is maintained by the server and database. Often times, this type of verification is conducted outside of the purview of other servers in an end-to-end secure fashion.

In the illustrated example, users can access the Internet through the use of a client computer or computing device. In the context of this document, a "user" refers to a human individual and a "client" refers to a computer or computing device that the human individual uses to access the Internet. The client can be a mobile computer such as a lap top computer, or can be any other suitable computing device. The client can be provided by the host organization, or can be a mobile computing device that travels with its particular user. When a user wishes to access the Internet, they simply use their client computer to interface with an access module 112. The access module permits communication with the authentication/negotiation component 110. Authentication/negotiation component 110 first authenticates the user by using one of the local or global authentication databases 108, 114 respectively. In the described embodiment, authentication takes place outside of the purview of the authentication/negotiation component 110. For example, when the global authentication database 114 is used, the authentication/negotiation component 110 permits the user to communicate directly with the database 114. This communication can advantageously take place using the Internet. In some embodiments, limited access to the Internet can be granted by the authentication/negotiation component 110 for the limited purpose of authenticating a user. After a limited period of time, if the user has not been authenticated, Internet access can be terminated. For example, an IP address might be temporarily granted to a user via a DHCP or NAT process. If the user has not authenticated themselves within a definable period of time (e.g. ten minutes), their internet access can be terminated. The database 114 takes the user through a separate authentication process (e.g. entry of a user name and password) SO that the user can be authenticated to the database 114. This authentication process can be a protected end-to-end secure process in which all of the user's transmissions to the database 114 are encrypted from the client machine and can be only decrypted by the database 114. An exemplary encryption technique is Secure Socket Layer (SSL) transmission. Other secure techniques can be used. This communication is secure from the authentication/negotiation component 110 and the host organization network 104.

Once the user is authenticated to the global authentication database 114, the database 114 generates a message to the host organization network 104 and informs the host organization network that the particular user has been authenticated. After the authentication has occurred, all communication with and access to the Internet takes place through the authentication/negotiation component 110. That is, all of the data packets that are transmitted from and received by the client are routed through the authentication/negotiation component 110.

An advantageous feature of the above architecture is that it enables a user to freely move about from host organization to host organization, without having their Internet access inextricably tied to any one particular ISP or to a particular company such as their employer. This system permits a much more individual-centric system that promotes user mobility, as will become apparent below. Another advantage of this architecture is that once a user is authenticated, they can move freely about without having to re-authenticate themselves to the system. Another advantageous feature of the above architecture is that users can have freedom of choice. That is, the authentication/negotiation component can be programmed to negotiate for services on behalf of the user. For example, a host organization network might have a number of different ISPs (e.g. AT&T, MCI, Sprint and the like) that are under contract to provide Internet access. A user can specify a particular level of service (i.e. transmission rate and desired cost structure). The authentication/negotiation component then negotiates the desired service level with the particular ISPs. Thus, a user can receive the best deal for their desired parameters. As an example, a particular user may be in a rush (i.e. between flights in an airport) and may need to have the fastest Internet access that is possible. Further, they may be willing to pay a top premium for such access. Once the authentication/negotiation component 110 is notified of these parameters, it can then find the ISP that most closely meets the user's parameters.

Exemplary Computer System

FIG. 2 shows an exemplary computer system that can be used to implement various computing devices, i.e. client computers, servers and the like, in accordance with the described embodiments.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary System Architecture

FIG. 3A shows an exemplary system architecture 100 that includes a wireless network feature. Although the discussion that follows is in the context of a network that includes the illustrated wireless feature, it is to be understood that the system architecture could, alternately, employ a wired network in substitution for the wireless network feature that is described below. In the discussion that follows, like numerals from the FIG. 1 example are utilized where appropriate, with differences being indicated with the suffix "a" or with different numerals.

In the illustrated example, multiple wireless nodes are provided. Each wireless node is constituted by an individual client. In the example, two clients or wireless nodes are shown, although in actuality, many wireless nodes would typically be employed. Each client computer typically has a network card installed therein which permits wireless communication. The wireless communication takes place through the use of known wireless techniques that will be apparent to those of skill in the art. Accordingly, these techniques are not discussed further. The client can comprise any suitable computing device which, in this example, is configured for wireless communication. Each of the wireless nodes is connected through an access module 112a. In the wireless example, each access module 112a comprises one or more access points 306 that permit wireless access in known ways using known protocols. In the illustrated example, all the access points 306, for a particular access module 112a, together constitute a single wireless subnet. This is advantageous from the network standpoint because of routing issues. For example, every subnet on the Internet is identified by a unique number. Every client connected to this subnet uses this number as part of its own unique identification. In the Internet, a subnet number is an integral part of the client's unique IP address. Various routers that are used in the network environment use the subnet portion of the IP address to determine where to route various data packets. When a client changes its subnet, its IP address also changes. By having all of the access points 306 in an access module that is associated with a single subnet, an individual is free to move between access points of the same subnet without having to change their IP address. This is particularly advantageous when the host organization network is located in a public place. For example, an individual may be traveling through a large airport in which a host organization network has been deployed. They may use a particular access point to access the Internet immediately upon disembarking from a plane. The individual can continue to stay connected to the Internet even as they move into different locations of the airport serviced by different access points 306. Because the user still accesses the Internet through the same wireless subnet, they need not be issued a different IP address. This further enhances the robustness and speed of the system. Access module 112a may or may not communicate wirelessly with authentication/negotiation component 110a.

Authentication/Negotiation Component

In the illustrated example, authentication/negotiation component 110a comprises a server 302 (referred to herein as a "Protocol for Authentication and Negotiation of Services" or "PANS" server) and a Policy Manager 304. The PANS server 302 may or may not be configured to receive wireless communication from access module 112a. The authentication/negotiation component 110a is communicatively linked with the host organization network 104. Any suitable communication link can be used. In various embodiments, such link can comprise a high speed wired connection or a wireless connection. The host organization network 104 is communicatively linked to the Internet 102 and, in some embodiments to ISPs 105 through conventional network systems.

The PANS server 302 is a software component that is designed to implement various functionalities that are described below. In the illustrated example, the PANS server 302 is programmed to handle all of the authentication issues and the negotiation of services for a particular user. In operation, all of a user's Internet data packet traffic (to and from) is routed through the PANS server 302. This is advantageous for a number of different reasons among which are included data packet accounting (e.g. for billing purposes), and traffic control (e.g. for administering user-selected quality of service levels).

The Policy Manager 304 is a software component that is responsible for managing the various policies that are used by the PANS server 302 in providing services to the different clients. The Policy Manager 304 can contain one or more policy tables that define various resource access policies (e.g. which users can access local resources 106 and what is the level of access), network access speeds, security levels and the like. For example, a corporation such as Microsoft might negotiate a service package with a particular host organization network that has a wireless network with Internet access deployed in the Seattle-Tacoma (SeaTac) airport. The negotiated package provides that for any Microsoft employee, the host organization would allow, free of charge, a certain service level. Service levels above the negotiated service level may cost the employee a nominal charge. The Policy Manager 304 then maintains an entry in its policy table that indicates that Microsoft employees are to be granted free access to the host organization's network at the negotiated level. Accordingly, when any Microsoft employee logs onto the SeaTac network, the Policy Manager 304 indicates to the PANS server 302 that access for this user at the negotiated service level is to be free of charge. Accordingly, the PANS server 302 interacts with the Policy Manager 304 to decide which of the client's packets will be allowed passage to the Internet and how they will be scheduled for transmission. In addition, data packets from the client also pass through the PANS server 302 before they are allowed to be transmitted to the host organization's network, e.g. the host organization's intranet.

In one aspect, the Policy Manager 304 is a distributed Policy Manager where the policies that are provided by the Policy Manager are not locally verifiable. As an example, consider the following: The Policy Manager 304 can contain many different policies that govern or regulate Internet access for many different classes of individuals. For example, Boeing may have negotiated for a quality of service level 1 (discussed below in more detail) for all of its employees. There may also be a policy that governs or regulates Internet access for members of certain clubs, i.e. the Gold Club Frequent Fliers. Having to locally verify the authenticity of users claiming to be Boeing employees and/or members of the Gold Club Frequent Fliers could be a daunting task, although it could be done. A much better approach is to verify the authenticity of these users using one or more globally accessible authentication databases. For example, both Boeing and the Gold Club Frequent Fliers may have their employees (members) registered with a central globally accessible authentication database such as MS Passport. In this case, when a user logs into the system, the authentication/negotiation component 110a passes the user to the database, e.g. via a hyperlink, for authentication. After the user is properly authenticated, the authentication/negotiation 110a provides Internet access at the negotiated service level. In some embodiments, and particularly where a user may be a member of more than one club or organization for which a service level has been negotiated, the authentication/negotiation component 110a can select the club or organization that provides the better quality of service level for the user. The authentication/negotiation component 110a can then pass the user to the appropriate authentication database so that the user can be authenticated for the particular selected club or service level. Once authenticated for the particular club or service level, Internet access can be provided by the authentication/negotiation component 110a in accordance with the negotiated service level.

The authentication/negotiation component 110a can also include (although it is not specifically shown) a dynamic host configuration protocol (DHCP) server that is responsible for issuing and managing IP addresses. DHCP servers are known and will not be further discussed herein. Alternatively, the authentication/negotiation component 110a can include a Network Address Translator (NAT) software module. NAT is responsible for issuing private addresses to clients and then translating these to public routable IP addresses. NAT is also known and will not be further discussed herein.

In the illustrated example, a global authentication database 114a is provided in the form of Microsoft's Passport Server. As pointed out above, any suitable global database can be used. This global authentication database 114a can comprise multiple different machines that are located globally around the world. The database is used, in one embodiment, to authenticate users as will be described in the "Authentication" section just below.

Alternate Architecture

Figure 3B:
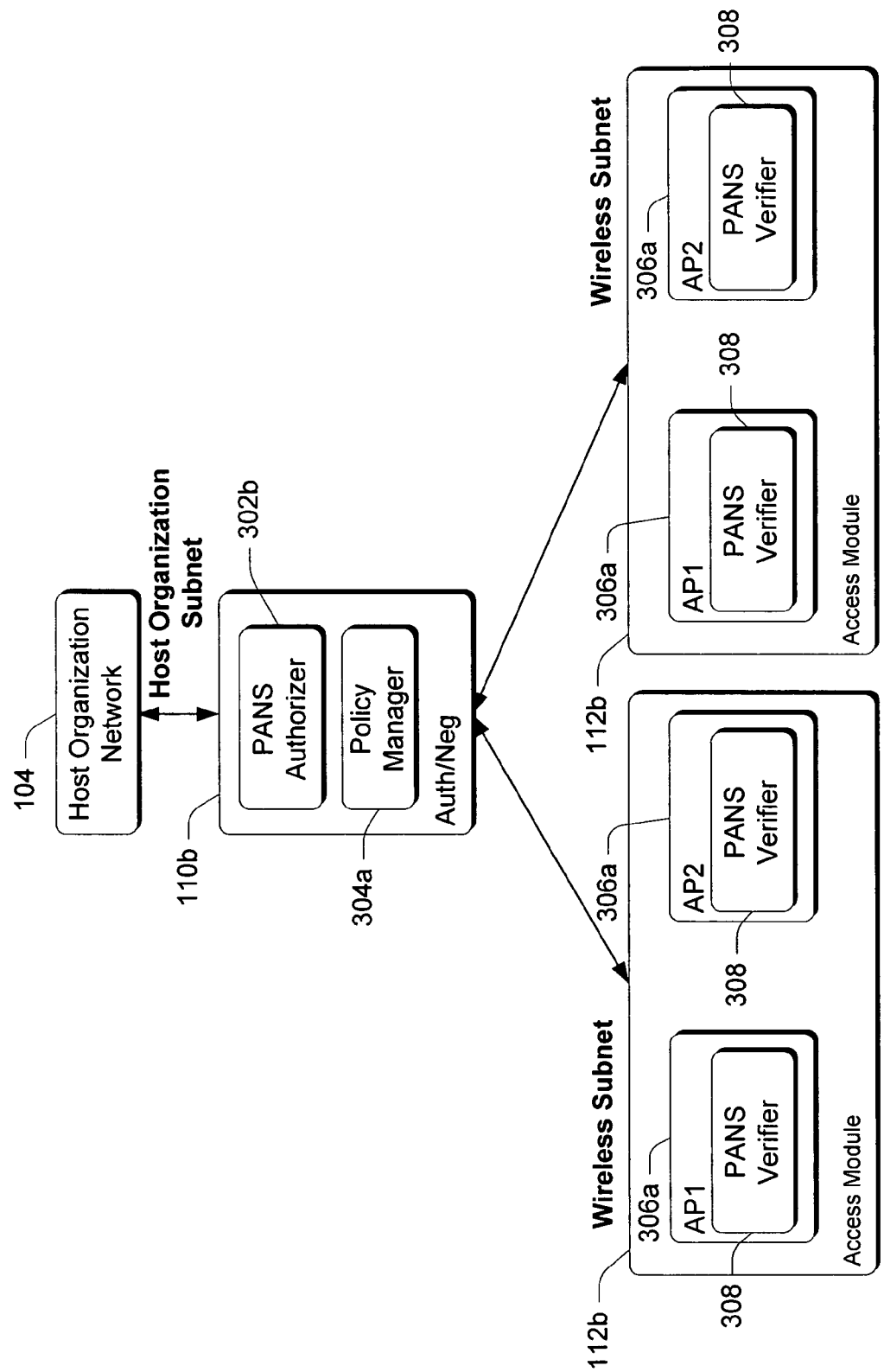
FIG. 3B is a high level diagram of an exemplary wireless system architecture in accordance with one embodiment.

FIG. 3b shows an alternate architecture in which the host organization subnet comprises a authentication/negotiation component 110b that includes a PANS Authorizer 302b and a policy manager 304a. The PANS Authorizer 302b authenticates users just as described above. In this particular architecture, the verification functionality is shifted to the access modules 112b in the form of a PANS verifier module 308 that resides at one or more of the access points of the access module. In the illustrated example, a PANS verifier 308 resides at each of the access points. The advantages of providing a PANS verifier at each access point include the detection of rogue users early on before they access the system. That is, once a user is authenticated, the PANS Authorizer 302b passes the verification function to the PANS verifier 308 at one or more of the access points. Thus, whenever a user attempts to send a data packet to the Internet, they are verified at the access module before the packet is transmitted to the authentication/negotiation component 110b. If a rogue user attempts to transmit an unauthorized packet, the packet can be detected very early in the architecture chain.

Authentication

In the described embodiment, individual authentication is provided for each of the users. This can be done in a manner that is independent of any affiliation that the user might have, such as an employer affiliation or an ISP affiliation, thus providing an individual-centric approach to authentication. In this example, a user is simply authenticated to the system architecture. The system architecture then takes over and provides the user with different options for accessing the Internet.

FIG. 4 is a flow diagram that describes steps in an authentication method in accordance with the described embodiment. The description that is given just below is given in the context of the architecture that is shown in FIG. 3A.

Step 400 establishes a link between a user and an access point 306. This step can be accomplished by a user physically traveling to a location that is within transmission range of the access point. As an example, a shopping mall owner might have a deployed wireless network that includes one or more access points 306. A user might bring their own configured computing device (i.e. laptop) to the mall, or might use a mall-provided computing device. The user then establishes a wireless communication link with the access point 306. The wireless link can be established through the use of any suitable techniques. The communication link need not, however, be a wireless link as pointed out above.

Once the link is established, step 402 displays a user interface under the influence of a browser that is executing on the client computing device. The user interface welcomes the user to the wireless network and provides a mechanism through which the user can be authenticated to the system. This can be done in a number of different ways. For example, the user may click on an icon to see a list of member organizations for which various service levels have been previously negotiated. The user then selects one or more of the organizations to which they belong. The authentication/negotiation component 110a can then select a user-designated organization whose plan offers the best Internet access and then authenticate that user for that particular organization as described above.

Any suitable authentication method can be used. In the illustrated example, it has been found particularly advantageous to authenticate the user in a manner that provides end-to-end security between the user and the authenticating entity. In this example, a global authentication database 114a is utilized as the authenticating entity to authenticate the user. Accordingly, step 404 provides a secure link between the user or client machine and the global authentication database 114a. The secure link can be established by having the user click on a browser page icon that links the user to the authentication database 114a. One example of a secure link can be one that is established through the use of Secure Socket Layer (SSL) techniques. By authenticating the user in this manner, the user's authentication information is encrypted before it leaves the client machine. This means that the authentication/negotiation component 110a is unable to ascertain any of the user's authentication information, e.g. the user's password and the like. This provides a very high degree of security and greatly reduces the chances that a user's protected information will be compromised. The user's information can then only be decrypted by the authenticating authority which, in this example, is the MS Passport Server 114a. Authenticating the user in this manner greatly improves upon systems that authenticate a user by serving as a proxy for the user.

Once a secure link is established between the user and the global authentication database, step 406 authenticates the user to the global authentication database. This step can be implemented by displaying a suitable logon web page for the user in which they provide their user name and password for the global authentication database. Once the global authentication database confirms the user's information, the user is authenticated.

At this point, when the user has been authenticated to the global authentication database, communication can now take place in the background between the global authentication database 114a and the PANS server 302. Specifically, step 408 notifies the authentication/negotiation component 110a, i.e. the PANS server 302, that the user has been authenticated. This step can be implemented by having the global authentication database generate a message and send it to the PANS server 302. Once the PANS server receives the notification, it can then, if necessary, receive any additional information about the user that it needs. For example, the global authentication database 114a might contain the user's credit card information or other information that can be utilized to bill the user (e.g. billing address etc.). Accordingly, step 410 determines whether any additional information is needed about the particular user. If additional information is needed, then the PANS server 302 receives the information (step 412) from the global authentication database 114a. If no additional information is needed, or in the event that any needed information is received, step 414 generates a unique token for the user. In the illustrated and described example, the PANS server 302 generates a unique token or key for each of the individual users. Step 416 then provides the user token or key to client machine for use during the user's session. Specifically, the token or key is used by the client computer each time a data packet is sent to the Internet via the PANS server 302. The token or key assists the PANS server 302 in identifying data packets from authenticated users. Specifically, the PANS Server 302 maintains a list of tokens that have been distributed to authenticated users. On receiving a data packet with an embedded token, the PANS server 302 checks the list to determine whether a particular token is valid. If a token is determined to be invalid, then the PANS server 302 can refuse to further transmit the data packet into the Internet or the host organization's intranet. The PANS server 302 can be used to allow only those data packets which contain a valid token.

As a further added degree of security, each token or key that is used by a particular user is encrypted so that unscrupulous users cannot steal another user's token. In this example, only the client computer and the PANS server know the particular user's token or key. Any suitable encryption techniques can be used to encrypt the user's token.

Security

In addition to providing end-to-end security, as in the case of user authentication, other additional security measures can be provided to protect the communication that takes place between the PANS server 302 and the client.

In the described embodiment, after the user is authenticated, the PANS server 302 can issue the user a key. Advantageously, each user is issued a different key. This key can be transported to the user using secure transport protocols, e.g. https. The client then adds this key to each outgoing data packet, uses the key to encrypt the resulting packet, and then transmits it to the PANS server 302. On receiving the encrypted data packet, the PANS server decrypts the packet and checks the embedded key for validity. If the key is valid, the PANS Server 302 removes the key from the data packet, and then passes the data packet on to the Internet. If the PANS server 302 finds a invalid key in the packet, it simply drops the packet without forwarding it on to the Internet. The ability of the PANS server 302 to dynamically generate a key for each user constitutes an improvement over other network systems that utilize a fixed number of keys for a variable number of users. In those systems there might be, for example, four or five keys that are allocated for use among numerous different users. Thus, a plurality of different users will use the same key to encrypt their data. If one of the fixed keys is broken for one particular user, then the data that is associated with all of the other users who share that key can be compromised as well. In the present case, breaking the key for one user carries with it no implications insofar as other users are concerned.

In another aspect, the keys that are issued by the PANS server 302 can have an arbitrary length. For example, key lengths can be selected to be 40 bits, 128 bits, or 256 bits in length. Selection of the key length might take place randomly. Alternately, a user may be able to select the length of key that is used. Alternately, the user might select from a number of quality of service levels that each provide different length keys in accordance with varying degrees of security. For example, a user may have information that is only generally sensitive. In that case, a smaller key length may be in order to protect the information. Alternately, a user might have information that is highly sensitive. In this case, a longer key length may be in order. As will be appreciated by those skilled in the art, the length of a key is proportional to the computational overhead that is necessary to process the key. The same relationship holds true for the computational overhead that is required to break the key. In one aspect, the user may be presented with different payment options that are associated with the varying degrees of security. For example, for a small fee, a key length of 40 bits might be purchased. For a somewhat larger fee a 128-bit key might be purchased. For an even larger fee, a 256-bit key might be purchased. Thus, in this example, a user can purchase various degrees of security that protect their communication with the PANS server.

In yet another aspect, varying degrees of encryption can be provided to further enhance security. In this case, a user might be able to select from among options that provide for no encryption to a very high level of encryption. For example, the highest level of encryption might involve encrypting an entire data packet. A lesser level of encryption might involve encrypting only the header of each data packet or only a portion of the body of each data packet.

In yet another aspect, flexible security measures are provided in the form of multiple different encryption/decryption algorithms that are available for selection by the PANS server 302. For example, the PANS server 302 may have a number of different encryption algorithms, e.g., five or six different encryption algorithms from which it can select. When the server issues a key to a user or client, it can also designate which of the five or six algorithms to use for encryption. Thus, the server 302 can randomly assign an encryption algorithm to the client. In one aspect, the different encryption algorithms might be differently priced depending on the complexity of the encryption. In this case, the different encryption algorithms might be incorporated in the different service level packages that are discussed in more detail below.

Each of these additional aspects provides a robust security environment for the communication that takes place between the client and the PANS server 302. In the wireless embodiment this is particularly advantageous because of the openness with which the communication between the client and the PANS server 302 takes place, and its susceptibility to eavesdropping. One or more of these additional aspects can be combined for a particularly robust combination of security measures. For example, in addition to each user having a randomly generated key, certain users may have a key length of 40 bits, while other users have a key length of 128 bits. Further, users may also, in addition to having variable length keys, have different encryption algorithms as between them. Further, the different security measures can be grouped into different quality of service levels that can be purchased by a user, as will be discussed below in more detail.

FIG. 5 is a flow diagram that describes steps in a security process in accordance with the described embodiment. The processing that is described just below further embellishes steps 414 and 416 of FIG. 4. Various steps that are described by FIG. 5 are implemented by the PANS server 302 and the client. FIG. 5 designates the steps that are performed by the PANS server 302 by setting them forth on the left side of the flow diagram. Likewise, the steps that are performed by the client are set forth on the right side of the flow diagram.

Step 500 presents one or more security options to a user. This is done by displaying on the client machine a page that specifies the various security options. For example, a user may elect to use no security or may select from among a number of different levels of security. FIG. 6 shows an exemplary page 600 that can be displayed on the client machine. There, a user is given an opportunity to select from among a number of different key lengths. Page 602 shows another security option that enables a user to select the number of encryption algorithms from which a single algorithm will be selected for use. The key length, number of encryption algorithms, and encryption level (header only versus entire packet) can be tied to a fee that is paid by the user.

Step 502 selects a security option. Step 504 determines which security option has been selected by the user. Once the PANS server 302 determines the security option, step 506 generates a key and step 508 issues the key to the user or client machine using a secure https session. When the key is issued to the user, if appropriate, the client machine will also be notified as to which particular encryption algorithm to use in connection with the issued key. Step 510 receives the issued key. Subsequently, each time the client machine generates a data packet, this key is added to the packet and the resulting packet is encrypted with the key (step 512). Step 514 then transmits the encrypted data packet to the PANS server 302. Each data packet that is received by the PANS server is then decrypted, the key is extracted and checked for validity. If the key is valid the packet is allowed passage into the host organization's Intranet or into the Internet as appropriate.

Quality of Service

In one embodiment, multiple service levels are provided and are available to each user. A user can be given an opportunity to purchase a certain service level. Alternately, the user might be a member of one or more organizations that have arranged for a certain service level on behalf of their members.

Each service level can provide the user with a bundle of services that fit that particular user's needs. Each service level can have one or more services associated with it. These services can be provided in varying degrees between the different service levels. As an example, consider that there are three service levels that are available to a user—Level I (premium service), Level II (enhanced service) and Level III (basic service). The premium service level is the most expensive, followed by the enhanced service level and the basic service level.

Figure 7:
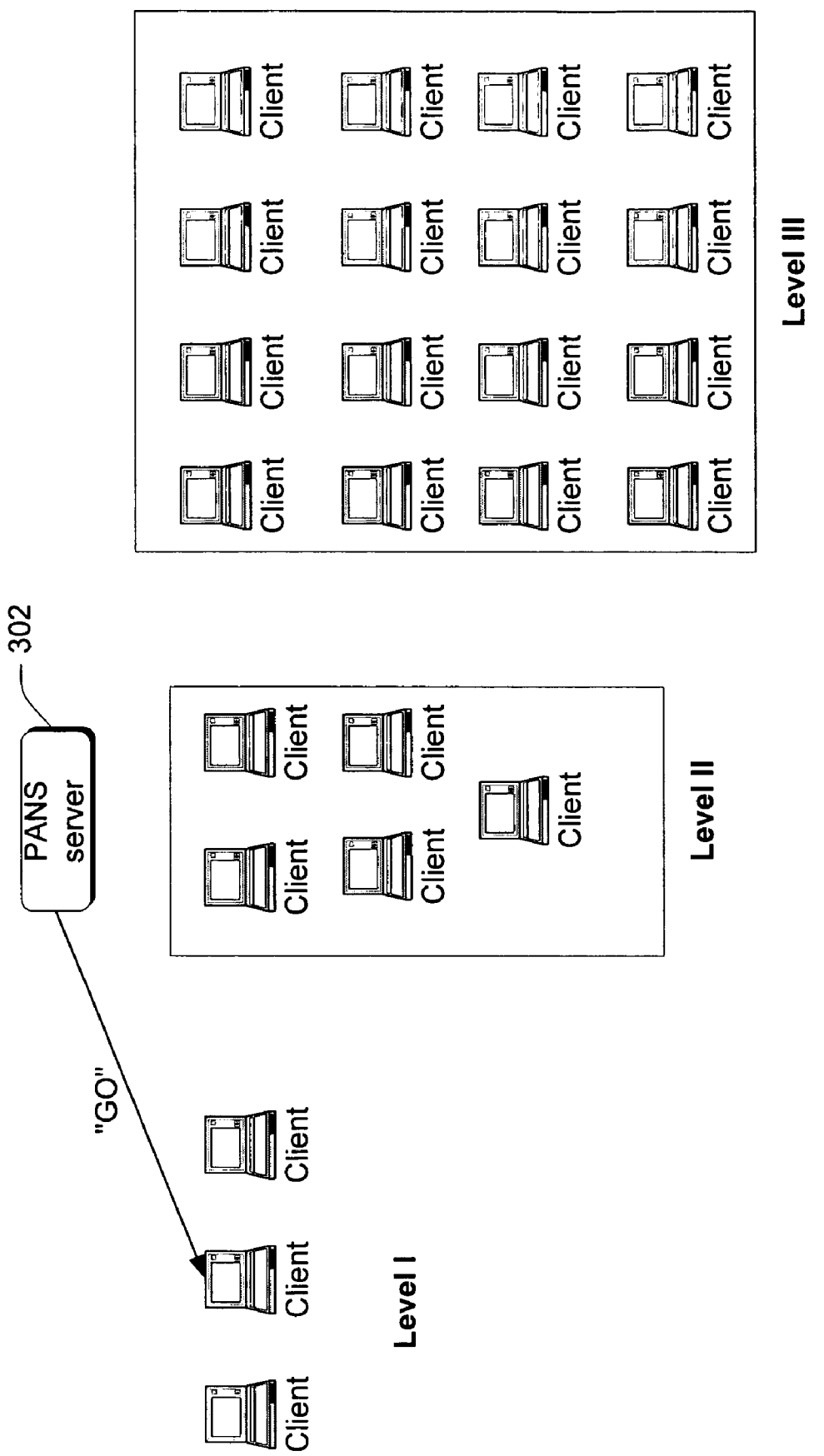
FIG. 7 is a diagram that illustrates an exemplary quality of service embodiment.

FIG. 7 diagrammatically illustrates the three exemplary service levels. In this particular example, the Level I premium service is provided to individual users on a per node (per user) basis. In this example, each of the individual users is guaranteed a certain portion of bandwidth for their data packet transmissions. In addition, the service level can have a degree of security associated with it. In this example, the premium service level might have the highest degree of security, examples of which are given above in the "Security" section. Each of the additional service levels (enhanced and basic) is provided on a class basis. That is, users that opt to purchase or are provided these levels of service are aggregated into a user group. Each user group is then assigned a portion of bandwidth and perhaps a security degree. Each group is then responsible for arbitrating amongst its members for the available bandwidth. In this example, the enhanced Level II service group has a smaller number of group members than the basic Level I service group. In the illustrated quality of service embodiment, each user is given a fair share of the available bandwidth.

As an example, consider that in exchange for paying a service fee, Level I users are given individual reservations slots that individually guarantee an amount of bandwidth, e.g. 200 Kbps. Level II users, as a group, also receive a guarantee of available bandwidth, e.g 200 Kbps. The individual group members must, however, allocate the bandwidth between them when it is their turn to transmit their data packets. Level III users receive the same guarantee as the Level II users, except that there are more users that must arbitrate for available bandwidth.

The inventive scheduling techniques provide a user-based scheduling system that greatly improves upon previously-used "flow-based" scheduling. In flow-based scheduling, streams of packets or "flows", are received from several computers. The flows typically originate from different applications. A single user may be executing more than one application that is producing and consuming a flow. A router typically evaluates the flows that it receives, and then attempts to allocate a fair share of the bandwidth among the different flows. Flow-based quality of service systems emphasize the flows and do not regard the source of the flows. For example, in a flow based system, it may be possible for one user with many different flows to consume all of the available bandwidth to the exclusion of the other users. The inventive user-based service system is different from the flow-based system because it makes its distinctions based on the users or user groups. In this way, the quality of service is improved for all flows, not just for the one flow that might happen to be usurping the available bandwidth. Amongst the individual users, flow based scheduling can, however, take place, e.g. by a user designating which of their flows should have priority. However, as between the individual users scheduling is accomplished on a user basis.

There are many ways that the above quality of service system can be implemented. In one embodiment, the quality of service system is implemented by the PANS server 302 as follows. Once all of the users have selected their quality of service levels, the PANS server 302 monitors the available bandwidth and generates a signal or message that is transmitted to the users when it is their turn to transmit their data packets. The users can select their quality of service level by purchasing the service level. Alternately, the quality of service level might be provided to the user as part of a package that was negotiated by an organization or employer on behalf of the user. Regardless, once the service level has been selected and the user authenticated, the PANS server 302 can transmit a "go" signal to an individual member of the Level I group when it is their turn to transmit. When the individual member receives the "go" signal, they can then begin to transmit their packets if they have any to transmit. Based upon the user token that is included with each packet transmission from the user, the PANS server 302 will be able to verify that the packet transmission is coming from the appropriate user and is therefore valid. After the individual user has transmitted enough of its packets, the PANS server notifies the user that its transmission time is over and then sends a "go" signal to another user or group. It is important to note that the PANS server can be programmed to monitor for packet traffic after the packets have left the sender. Monitoring the packet traffic can ensure that a user's packets have actually been transmitted to the Internet and are not sitting in a queue awaiting transfer. That is, in this case, the PANS server is programmed and can intelligently figure out in a real world sense whether the packets that have been provided by a user have actually been transmitted to the Internet so that they will not, at some time downstream, interfere with another's data packets. Assume for example, that 20 milliseconds of transmission time has been allocated among three users in the following amounts: 5 milliseconds (user 1), 5 milliseconds (user 2) and ten milliseconds (user 3). Assume also that user 1's transmission actually takes 6 milliseconds and user 2's transmission actually takes 7 milliseconds. That would mean that only 7 milliseconds of the total 20 milliseconds of transmission time are available for user 3. In this case, the PANS Service can monitor the packet transmission from the other users and can automatically and in a dynamic fashion adjust the allocation for user 3 to 7 milliseconds. When a group such as the Level II group receives a "go" signal, the group must then begin an arbitration sequence to arbitrate among the various group members for packet transmission. Arbitration may, however, be conducted in advance of receiving the "go" signal. Any suitable arbitration scheme can be used.

Figure 8:
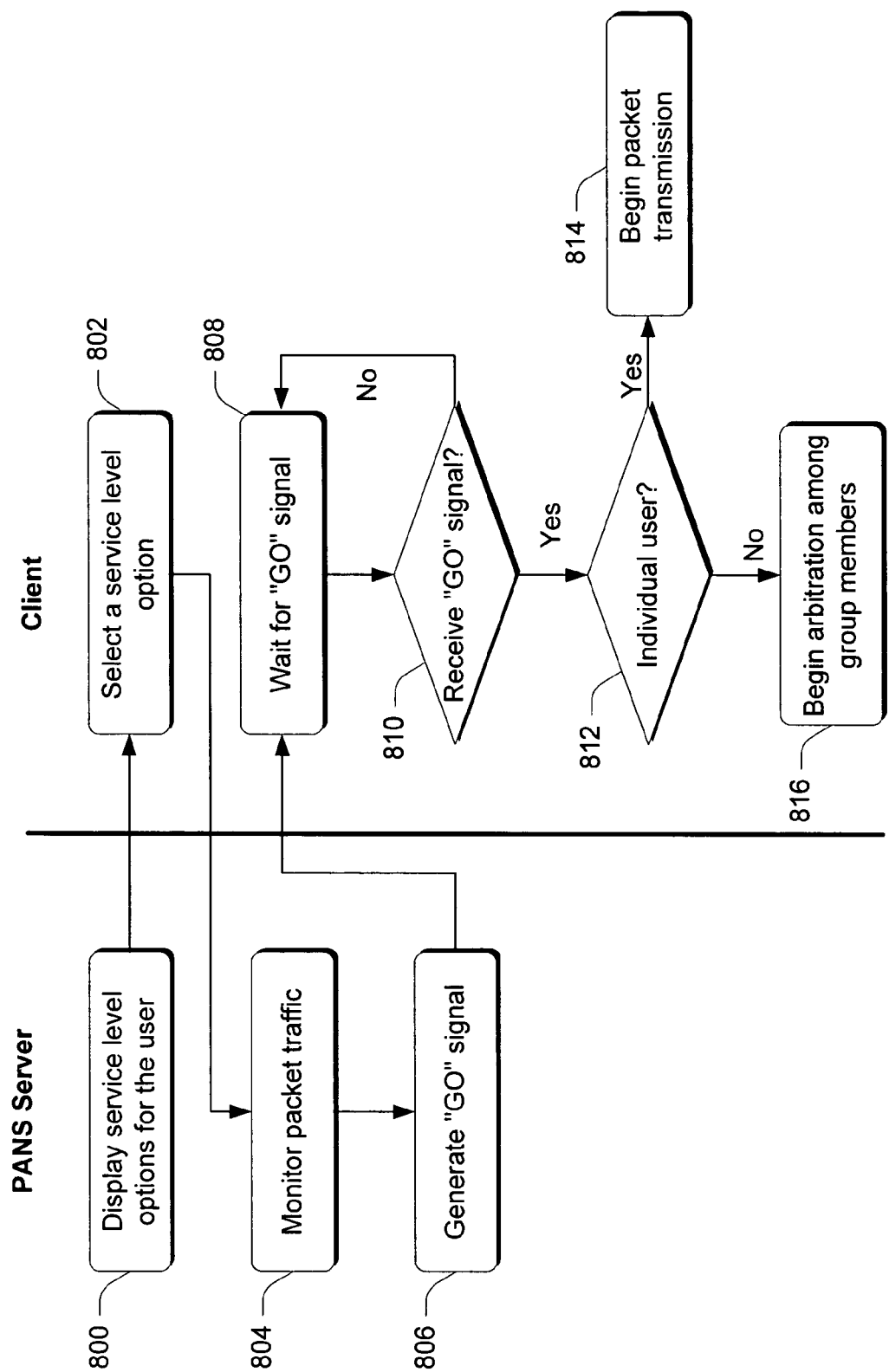
FIG. 8 is a flow diagram that describes steps in a method in accordance with one embodiment.

FIG. 8 shows a flow diagram that describes steps in a quality of service method in accordance with the described embodiment. Some of the illustrated steps can be implemented by the PANS server 302, while other of the steps can be implemented by the client. Step 800 displays one or more service level options for a user. In the described embodiment, the service level options can be displayed on the client machine so that the user can select an appropriate level. For example, if a user is in a busy airport and is between flights, they may only have a limited amount of time to transacts their on line business. In this instance, the user may select the premium Level I service level so that they have the best chance of transacting their business. The service level options might also be displayed in the form of a list that describes various member organizations that have negotiated for particular service levels on behalf of their members. Step 802 selects a service level option. This step can be implemented by the user selecting a particular displayed service level. Alternately, the user can select from among the groups that are described in the list of member organizations. After the user has been authenticated, step 804 monitors the data packet traffic that is generated from all of the users. Step 804 is typically a continuously implemented step in which the data packet traffic is monitored as users are added to and deleted from the collection of users that are transmitting data packets at any particular time. In this example, since all of the data packets from each of the users or clients gets routed through the PANS server, it is in the best position to oversee, monitor and control the packet flow. The PANS server then, in accordance with its programming instructions, generates a "go" signal when a user or group of users is authorized to transmit their data packets. Steps 808 and 810 wait to receive the "go" signal. Once the "go" signal is received, if the authorized recipient is an individual user (step 812), then they can begin their data packet transmission. If the authorized recipient comprises a group of users (e.g. Level II or III users), they can begin their arbitration process (step 816).

Accounting

In one embodiment, PANS server 302 implements an accounting function. That is, because all of the data packets get routed through the PANS server, it is in the best position to maintain an accounting of the packets that its sends and receives. By accounting for all of the data packets, the PANS server can ensure that users are billed for an accurate amount of bandwidth that they may have consumed. To do this, the PANS server may be communicatively linked with a billing database that is not specifically illustrated. The PAN server then communicates the particular user's use parameters (i.e. amount of time spent on the network, number of data packets transmitted/received, etc.) to the billing database which can then ensure that the user is billed an appropriate amount.

As an example, consider that billing is based on the number of packets that pass through the PANS server 302. When the PANS server sends a "go" signal to a particular user, if the user transmits only a small number of data packets, then in this example, the billing charge should be a small charge. Alternately, consider that the billing is based on the total amount of bits that are transmitted. The PANS serve 302 keeps track of the number of bits that are transmitted by the user and sees that the user is billed accordingly. Further consider that the billing is based on the amount of time an individual spends using the network. In this case, the PANS server can keep an accounting of the time so that the user can be billed accordingly. In addition, the PANS server can be configured to monitor a user's use of local resources, e.g. printers, scanners and the like. Accordingly, the PANS server can see that users are billed for the amount of the resource that they consume. It will also be appreciated that the PANS server can use its accounting feature to efficiently schedule users for data packet transmission.

Accounting for the data packets is also advantageous from the standpoint of assessing the collective system demand of members of various organizations that might have negotiated service level packages for their members. For example, if a particular organization's members placed an unusually high burden on the system that is not commensurate with the organization's negotiated service level, then measures might be taken to bring the burden in line with the negotiated service level. This might involve charging the organization a higher fee for its negotiated service level. It might also involve changing the organization's service level.

Figure 9:
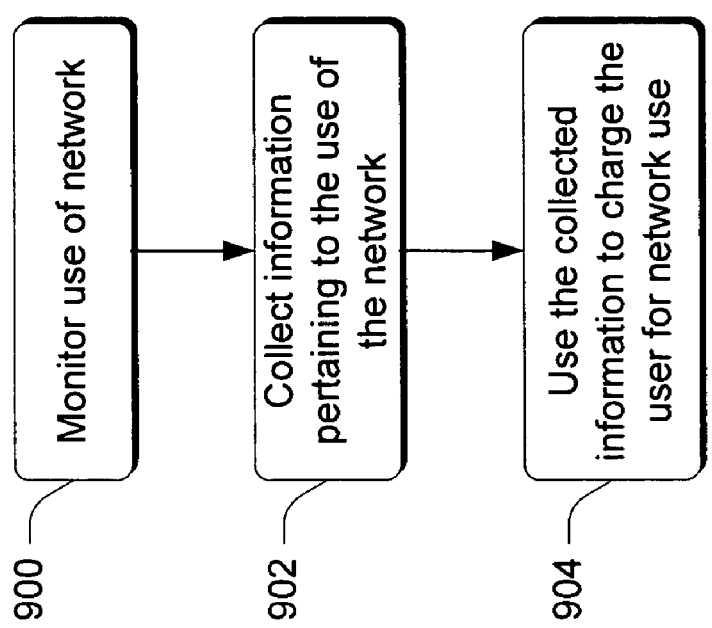
FIG. 9 is a flow diagram that describes steps in a method in accordance with one embodiment.

FIG. 9 is a flow diagram that describes steps in an accounting method in accordance with the described embodiment. Step 900 monitors the use of the host organization network. This step is most advantageously implemented by the PANS server 302. The PANS server can monitor the network use in a number of different ways. For example, the PANS server can monitor the packet traffic or the time that is spent on the network by the individual users. Step 902 collects information that pertains to the user's use of the network. Here, such information can include, without limitation, the total number of packets that are transmitted by a user, the total number of bytes that are transmitted by a user, or the total number of minutes that a user spends logged onto the network to name just a few. Once this information is collected by the PANS server, step 904 uses the information to charge the user for its network use. This step might be implemented by having the PANS server communicate the collected information to a billing server that receives the information and then generates a bill for the user.

Dynamic Compression

In one embodiment, dynamic data compression is utilized as a way to optimize data packet transmission. Dynamic data compression is particularly useful in the wireless embodiments for the following reasons. One way to enhance the use of available bandwidth is to compress the data that is being transmitted. By compressing the data, more data can be sent from the client to the PANS server and vice versa. In the wireless embodiment, there are certain error conditions that can occur that can corrupt the transmission of data packets. For example, if there is good line of sight between the client and the appropriate access point, then the chances of having a corrupted transmission is less likely than if there is an object that blocks the transmission pathway between the client and the access point. Consider, for example, a host organization network that is deployed in a shopping mall. There may be times when the amount of human traffic through the mall disrupts the transmission signals between the client and the access point, or between the access point and the PANS server. In these instances, it is highly desirable to curtail somewhat the amount of compressed data packets that are being sent. This follows logically from a realization that corruption events that corrupt compressed data are more destructive than corruption events that corrupt uncompressed data because in the former case, more data gets corrupted.

Figure 10:
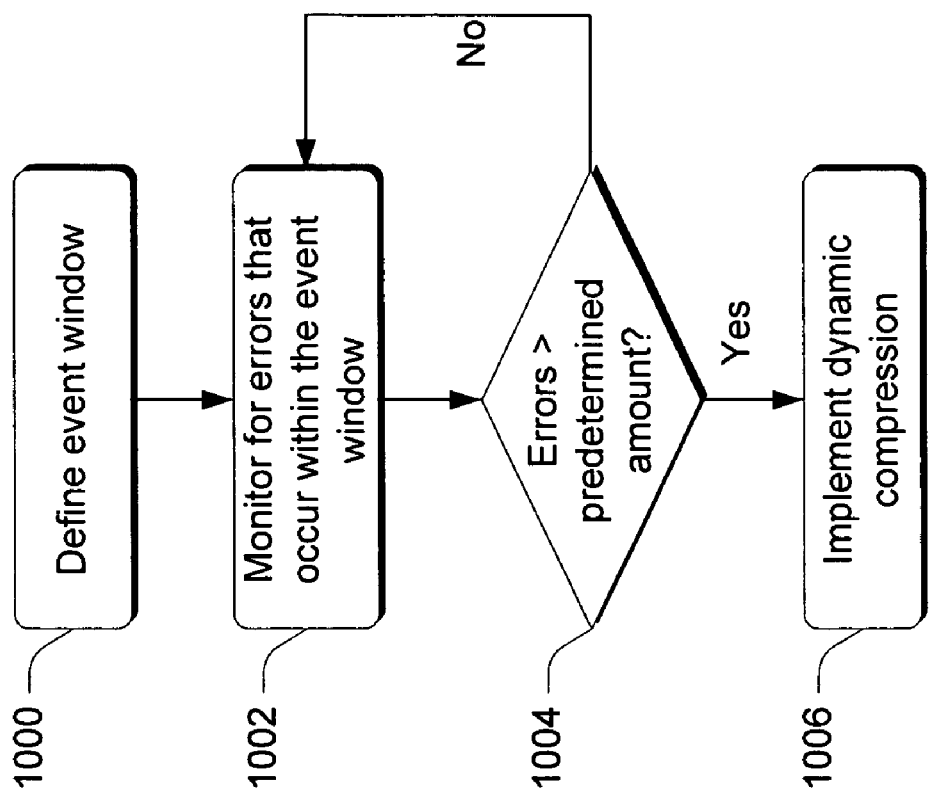
FIG. 10 is a flow diagram that describes steps in a method in accordance with one embodiment.

FIG. 10 is a flow diagram that describes steps in a dynamic compression method in accordance with the described embodiment. Dynamic compression can be performed by both the PANS server and the client machine. Step 1000 defines an event window within which monitoring takes place. The event window can be any suitable time frame for which monitoring is desired. Step 1002 monitors for errors that occur within the event window. The errors that can be monitored for include, without limitation bit errors, packet errors and the like. Monitoring can take place using any suitable monitoring techniques as will be understood by those of skill in the art. Accordingly, monitoring techniques are not discussed in detail any further. Step 1004 determines whether the errors that occur are greater than a predetermined amount. Errors can be accounted for in any suitable way. For example, the gross number of errors that occur in a given time period can be determined. Alternately, the error rate can be determined. During this time, a base line compression can be employed by the client and the PANS server. A base line compression can comprise using a certain compression algorithm or variation thereof. In addition, a base line compression can comprise compressing a certain amount of the data packets (e.g. a certain percentage) within the event window. If the errors exceed the predetermined amount, then step 1006 implements dynamic compression. Additionally, when a certain predetermined amount of errors is reached, Forward Error Correcting codes can be used. Forward Error Correcting codes will be understood to those of skill in the art and are therefore not discussed in any detail here.

When dynamic compression is implemented, its goal is to compress less of the data during a time period when there are more detected errors. This can be done in a number of different ways. For example, when an error threshold is exceeded, a different compression algorithm might be used. Alternately, when an error threshold is exceeded a lower percentage of data packets within the event window might be compressed using the same compression algorithm.

Figure 11:
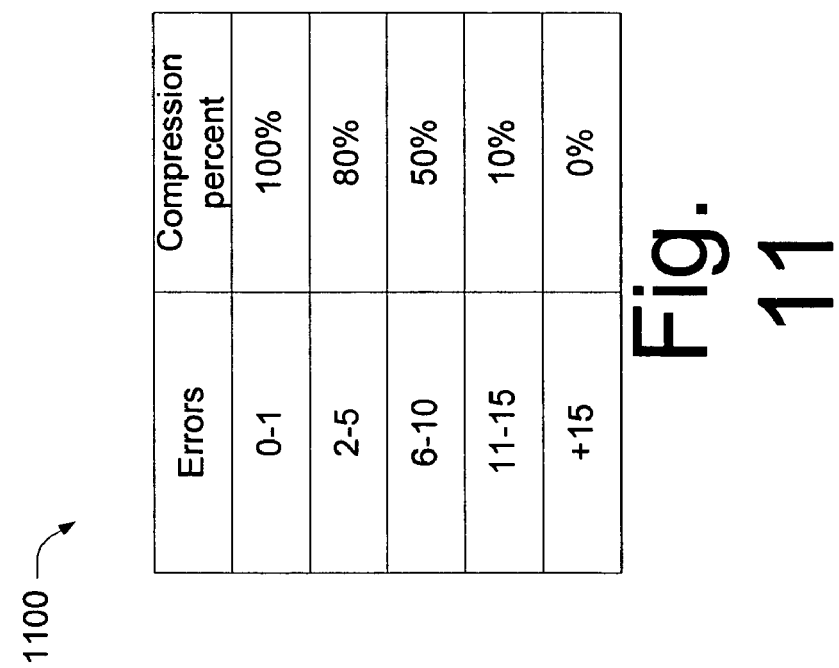
FIG. 11 is a diagram of an error table that is utilized in accordance with one embodiment.

FIG. 11 shows a look up table generally at 1100 that can be used, in one embodiment, to implement dynamic compression. Here, the look up table 1100 contains two fields—an error field and a compression percent field. In this example, there are 5 entries in the error field, i.e. 0-1, 2-5, 6-10, 11-15, +15. These entries constitute different thresholds for errors that can occur within the event window. Each of the entries in the error field is associated with a compression percent. In this example, the compression percentages range from 100% for when there are very few detected errors, to 0% for when there are a large number of detected errors. Accordingly, as the data packets are transmitted, as long as the detected errors in an event window do not rise above 1, all of the data packets in the event window will be compressed. If, for example, the detected errors rise to between 6-10, then the percentage of data packets that get compressed drops to 50%. This helps to ensure that during periods of transmission disruption, less of the data that is transmitted between the PANS server and the client are compressed thereby reducing the amount of data that is ultimately corrupted.

User Interface

Figure 12:
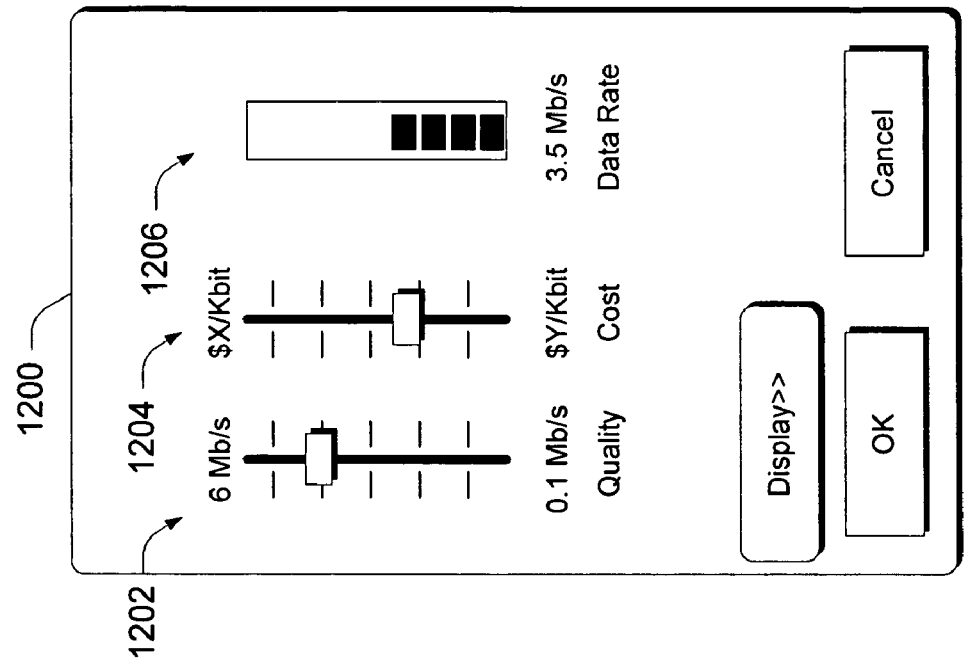
FIG. 12 is a diagram of a graphic user interface (GUI) in accordance with one embodiment.

FIG. 12 shows an exemplary graphic user interface generally at 1200. Interface 1200 is configured for display on a client computing device. In this example, the interface 1200 includes a bandwidth selector 1202 that is configured to enable a user of the computing device to adjust the bandwidth that is allocated to the computing device. Accordingly, a user is given the choice of the bandwidth allocation that they can receive. Interface 1200 also includes a cost selector 1204 that is configured to enable a user of the computing device to adjust the cost that is associated with the bandwidth that is allocated to the computing device. In this example, each of the selectors 1202, 1204 are sliders that can be manipulated with a user input device such as a mouse. By adjusting the cost (or the bandwidth allocation), the user can adjust the allocated bandwidth that they use to transmit their data packets. Accordingly, if a user is in a hurry (e.g. between flights in a busy airport), they could simply adjust one or both of the selectors to automatically select a high level of service that is available. In addition, a data rate display 1206 is provided that displays indicia of a data rate that is currently being provided to the computing device. This gives the user real time feedback so that they can confirm that they are in fact receiving the level of service that they selected and for which they will be charged.

CONCLUSION

The above-described methods and systems provide a mechanism for enhancing wireless functionality in the local area and pushing local area wireless system perform and functionality into the wide area space. High speed wireless Internet access can be provided in public spaces where host organization networks have been deployed. Access can be achieved at speeds up to 100× faster than traditional wireless WAN and 3G solutions. Various embodiments provide an individual-centric approach that enables users to pay for different levels of service, or to have different levels of service provided through arrangements with third party organizations. Enhanced services can be based on pricing and can include access to local network resources, policy-based networking and on-demand security. Aspects of the described embodiments provide for authentication/authorization, negotiation of services with service providers, service enforcement, security and user charging.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of providing Internet access comprising:
   establishing a communication link with a mobile computing unit;
   using the communication link to authenticate a user of the mobile computing unit by providing a secure link between the mobile computing unit and a global authentication database and presenting a logon web page to accept a user name and a password from the user to be submitted to the global authentication database, the user being unaffiliated with Internet Service Providers (ISPs);
   using the communication link to provide Internet access to the user of the mobile computing unit by negotiating with one or more said ISPs and selecting one of the one or more ISPs to provide the Internet access to the user of the mobile computing unit; and
   using a policy manager to provide various policies that govern user of the system by the user, at least one of the policies relating to service levels.

2. The method of claim 1, wherein at least one of the policies relates to access speed.

3. The method of claim 1, wherein at least one of the policies relates to security measures.

4. The method of claim 1, wherein at least one of the policies relates to use of system resources.

5. One or more computer-readable media having computer-readable instructions thereon which, when executed by one or more computers, cause the computers to:
   establish a communication link between a mobile computing unit and a server through an access point;
   use the communication link to authenticate a user of the mobile computing unit, the user being unaffiliated with Internet Service Providers (ISPs), wherein the communication link authenticates the user by providing a secure link between the mobile computing unit and a globally accessible authentication database, wherein the globally accessible authentication database is configured to present a logon web page to the user, receive logon information from the user, authenticate the user, and transmit authentication information associated with the user to the server;
   use the communication link to provide Internet access to the user of the mobile computing unit by negotiating with one or more said ISPs and selecting one of the one or more ISPs to provide the Internet access to the user of the mobile computing unit; and
   use a policy manager to provide various policies that govern user of the system by the user, at least one of the policies relating to service levels, wherein the policy manager is communicatively linked to the server.

6. The computer-readable media of claim 5, wherein at least one of the policies relates to access speed.

7. The computer-readable media of claim 5, wherein at least one of the policies relates to security measures.

8. The computer-readable media of claim 5, wherein at least one of the policies relates to use of system resources.

9. A system for providing access to the Internet, the system comprising:
   means for establishing a communication link with a mobile computing unit;
   means for using the communication link to authenticate a user of the mobile computing unit by providing a secure link between the mobile computing unit and a global authentication database and presenting a logon web page to accept a user name and a password from the user to be submitted to the global authentication database, the user being unaffiliated with Internet Service Providers (ISPs);
   means for using the communication link to provide Internet access to the user of the mobile computing unit by negotiating with said one or more ISPs and selecting one of the one or more ISPs to provide the Internet access to the user of the mobile computing unit; and
   means for using a policy manager to provide various policies that govern user of the system by the user, at least one of the policies relating to service levels.

10. The system of claim 9, wherein at least one of the policies relates to access speed.

11. The system of claim 9, wherein at least one of the policies relates to security measures.

12. The system of claim 9, wherein at least one of the policies relates to use of system resources.

13. The method of claim 1, wherein the secure link is established by the user clicking on a browser page icon that links the user to the global authentication database.

14. The method of claim 1, wherein the server is not given access to the user name and password.

15. The method of claim 1, wherein the secure link is established through the user of Secure Socket Layer (SSL) techniques.

16. The computer-readable media of claim 5, wherein the server is not given access to the logon information.

17. The system of claim 9, wherein the secure link is established by the user clicking on a browser page icon that links the user to the authentication database.

* * * * *